United States Patent
Katzer et al.

(10) Patent No.: US 7,970,436 B1
(45) Date of Patent: Jun. 28, 2011

(54) WIRELESS INTERFACE EXTENSION FOR MOBILE DEVICES

(75) Inventors: Robin D. Katzer, Olathe, KS (US); Carl J. Persson, Olathe, KS (US); M. Jeffrey Stone, Overland Park, KS (US)

(73) Assignee: Sprint Communications Company L.P., Overland Park, KS (US)

(*) Notice: Subject to any disclaimer, the term of this patent is extended or adjusted under 35 U.S.C. 154(b) by 902 days.

(21) Appl. No.: 11/534,633

(22) Filed: Sep. 22, 2006

(51) Int. Cl.
| | |
|---|---|
| H04B 1/38 | (2006.01) |
| H04B 7/00 | (2006.01) |
| H04M 1/00 | (2006.01) |
| H04M 3/00 | (2006.01) |
| H04H 40/00 | (2008.01) |
| G09G 5/00 | (2006.01) |

(52) U.S. Cl. .......... 455/557; 455/556.1; 455/569.2; 455/41.2; 455/41.3; 455/3.06; 455/420; 345/2.3

(58) Field of Classification Search ............ 455/557, 455/569.2, 575.1, 556.1, 41.2, 41.3, 569.1, 455/3.06, 420; 345/2.3; 715/744
See application file for complete search history.

(56) References Cited

U.S. PATENT DOCUMENTS

| | | | | |
|---|---|---|---|---|
| 5,550,754 A * | 8/1996 | McNelley et al. | | 348/14.01 |
| 5,793,416 A * | 8/1998 | Rostoker et al. | | 348/14.13 |
| 6,009,336 A * | 12/1999 | Harris et al. | | 455/566 |
| 6,640,113 B1 * | 10/2003 | Shim et al. | | 455/566 |
| 6,670,950 B1 * | 12/2003 | Chin et al. | | 345/173 |
| 6,825,830 B1 * | 11/2004 | Kanesaka et al. | | 345/156 |
| 6,885,877 B1 * | 4/2005 | Ozaki et al. | | 455/556.1 |
| 6,937,732 B2 * | 8/2005 | Ohmura et al. | | 381/86 |
| 7,003,328 B2 * | 2/2006 | Kuwazoe | | 455/566 |
| 7,006,055 B2 * | 2/2006 | Sukthankar et al. | | 345/1.2 |
| 7,277,726 B2 * | 10/2007 | Ahya et al. | | 455/557 |
| 7,383,983 B2 * | 6/2008 | Gaumond et al. | | 235/375 |
| 7,469,156 B2 * | 12/2008 | Kota et al. | | 455/575.4 |
| 7,499,699 B2 * | 3/2009 | Rodriguez et al. | | 455/420 |
| 7,577,910 B1 * | 8/2009 | Husemann et al. | | 715/744 |
| 7,580,005 B1 * | 8/2009 | Palin | | 345/1.1 |
| 7,737,915 B1 * | 6/2010 | Vishlitzky | | 345/2.3 |
| 2002/0090980 A1 * | 7/2002 | Wilcox et al. | | 455/566 |
| 2002/0173344 A1 * | 11/2002 | Cupps et al. | | 455/566 |
| 2003/0064759 A1 * | 4/2003 | Kurokawa et al. | | 455/566 |
| 2003/0153355 A1 * | 8/2003 | Warren | | 455/557 |
| 2003/0211865 A1 * | 11/2003 | Azami et al. | | 455/557 |
| 2004/0058703 A1 * | 3/2004 | Eromaki et al. | | 455/550.1 |
| 2004/0067770 A1 * | 4/2004 | King et al. | | 455/557 |
| 2005/0101342 A1 * | 5/2005 | Chuang | | 455/550.1 |
| 2005/0143098 A1 * | 6/2005 | Maillard | | 455/456.5 |
| 2007/0010289 A1 * | 1/2007 | Mezue | | 455/567 |
| 2007/0021148 A1 * | 1/2007 | Mahini | | 455/557 |
| 2007/0149247 A1 * | 6/2007 | Wong | | 455/557 |
| 2007/0225037 A1 * | 9/2007 | Koike | | 455/556.1 |

FOREIGN PATENT DOCUMENTS

GB EP0333330 A1 * 9/1989

* cited by examiner

Primary Examiner — Nghi H Ly
Assistant Examiner — Larry Sternbane

(57) ABSTRACT

A wireless interface extension for mobile devices is provided. The wireless interface extension includes a user interface, a wireless communication link, and a processor. The processor communicates with a mobile device over the wireless communication link and enables a user to use the user interface to interact with at least one user application on the mobile device.

16 Claims, 4 Drawing Sheets

WIRELESS INTERFACE EXTENSION FOR MOBILE DEVICES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile devices have the capability to execute a wide variety of user applications. However, the utility of many user applications is limited by the size of the displays and input controls for mobile devices, which make many user interactions more difficult. Furthermore, mobile device communications are often interrupted, which interrupts the utility of many user applications. Finally, interacting with large amounts of content from mobile device communications is also difficult due to storage limitations for mobile devices.

SUMMARY

Accordingly, the present disclosure provides systems and methods for a wireless interface extension for mobile devices. In some embodiments, the disclosed wireless interface extension includes a user interface, a wireless communication link, and a processor. The processor communicates with a mobile device over the wireless communication link and enables a user to use the user interface to interact with at least one user application on the mobile device.

In some embodiments, the methods disclosed herein include displaying a graphical user interface for a mobile device application on a wireless interface extension, receiving user input via the wireless extension, and communicating the user input to at least one user application on a mobile device over a wireless communication link.

In some embodiments, the system includes a mobile device configured to operate with a wireless interface extension. The mobile device includes a wireless communication link; a user interface, and a processor. The user interface enables a user to communicate with at least one user application on the mobile device. The processor communicates activity of the at least one user application to the wireless interface extension over the wireless communication link.

These and other features and advantages will be more clearly understood from the following detailed description taken in conjunction with the accompanying drawings and claims.

BRIEF DESCRIPTION OF THE DRAWINGS

For a more complete understanding of the presentation and the advantages thereof, reference is now made to the following brief description, taken in connection with the accompanying drawings in detailed description, wherein like reference numerals represent like parts.

DETAILED DESCRIPTION

It should be understood at the outset that although implementations of various embodiments of the present disclosure are described below, the present system may be implemented using any number of techniques, whether currently known or in existence. The present disclosure should in no way be limited to the implementations, drawings, and techniques described below, but may be modified within the scope of the appended claims along with their full scope of equivalents.

Embodiments of the present disclosure provide systems and methods for a wireless interface extension for mobile devices. In some embodiments, this interface extension provides a large, versatile user interface through which a user can control his mobile device and the various applications running thereon. For example, the user of the interface extension may leverage a navigation application on a mobile phone, with the interface extension displaying navigation directions on a screen significantly larger than the mobile phone screen. In another example, the user of the interface extension may leverage a game application on a mobile phone for her children to play on the interface extension in her automobile. In addition, the interface extension may provide additional storage and processing power to enable the wireless interface extension to output content to the user when the mobile device is not communicating with a mobile device network.

Figure 1:
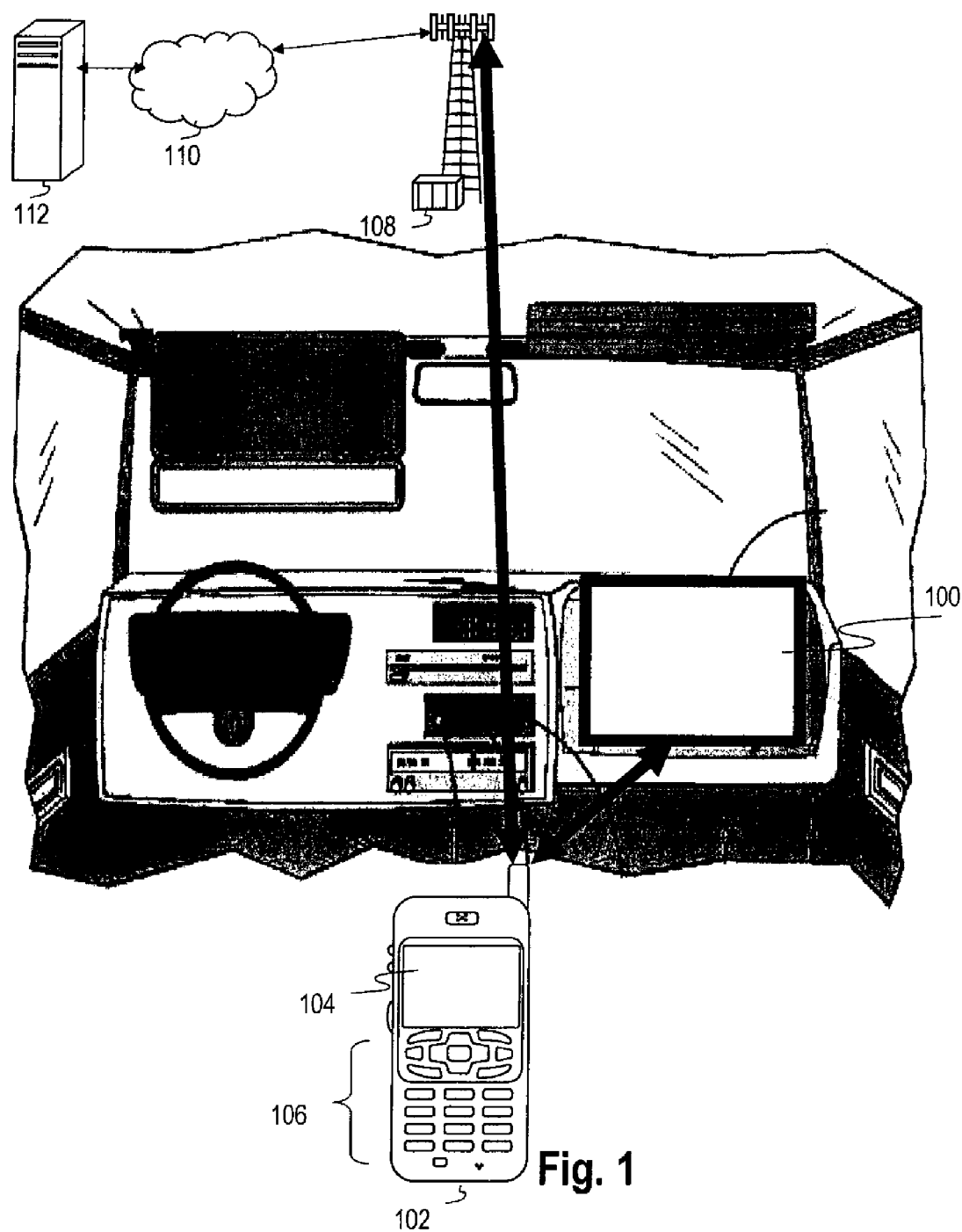
FIG. 1 shows an illustrative mobile device wireless interface extension mounted on the dashboard of an automobile.

FIG. 1 shows an illustrative wireless interface extension 100 mounted on the dashboard of an automobile in communication with an illustrative mobile device 102 of one of the occupants. Though illustrated as a mobile phone, the mobile device 102 may take various forms including a personal digital assistant (PDA), a digital camera, and a digital music player. Many suitable mobile devices combine some or all of these functions.

The mobile device 102 includes a display 104 and a touch-sensitive surface or keys 106 with which to interact with a user. The user may also interact with the mobile device 102 using the illustrative wireless interface extension 100 to communicate with the mobile device 102, which is described in greater detail below with reference to FIG. 3. In alternative embodiments, the wireless interface extension may communicate with multiple mobile devices in turn or concurrently. The mobile device(s) preferably communicate wirelessly with the wireless interface extension 100 using, e.g., Bluetooth or other suitable protocols.

Although depicted as mounted on the dashboard of an automobile, the wireless interface extension 100 may be mobile and may be taken with the mobile device 102 to other locations. The wireless interface extension 100 may include a touch screen that provides the functions of the display 104 and the touch-sensitive surface 106 for the user. For a mobile device 102 with the capability of inputting voice commands to communicate with user applications, the wireless interface extension 100 may include an audio input to input voice commands to communicate with user applications.

In interacting with a user, the mobile device 102 may present options for the user to select, controls for the user to actuate, and/or cursors or other indicators for the user to operate, either directly through the mobile device 102 or indirectly through the wireless interface extension 100. The mobile device 102 may further accept data entry from the user directly or indirectly, including numbers to dial or various parameter values for configuring the operation of the mobile device 102. The mobile device 102 may further execute one or more software or firmware applications in response to user commands. These user applications may configure the mobile device 102 to perform various customized functions in response to user interaction.

Because the wireless interface extension 100 leverages the mobile device 102 by enhancing and extending the capabilities of the mobile device 102, the wireless interface extension 100 is not necessarily a stand-alone component. Consequently, some embodiments of the wireless interface extension 100 may not have means for directly communicating with a cellular network or directly receiving broadcast television, radio, or satellite signals. Therefore, the user has no need to distribute new contact information for the wireless interface extension 100, nor to pay separate expenses for services supporting the wireless interface extension 100. For example, the user of the wireless interface extension 100 who leverages a navigation application on a mobile phone has no need to pay for a separate navigation service for her automobile. In another example, the user of the wireless interface extension 100 who leverages a game application on a mobile phone has no need to purchase a separate game device for her children to play in her automobile.

The mobile device 102 may communicate through a cell tower 108 and a wired network 110 to make phone calls or to access information on various servers, such as a server 112. While one server is shown in FIG. 1, other servers could be present. The server 112 may communicate with the mobile device 102 through the wired network 110 and the cell tower 108 by a standard wireless telephony protocol (such as code division multiple access), a wireless internet connection, or some other means of wireless communication.

Figure 2:
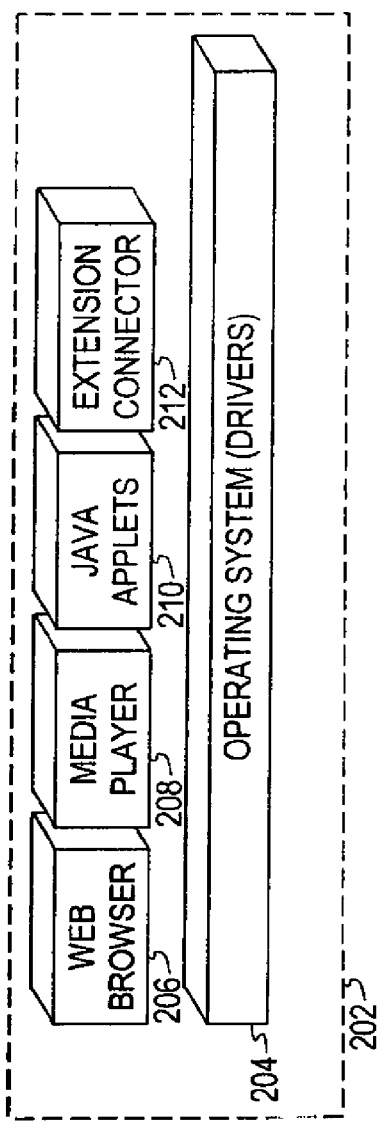
FIG. 2 shows a block diagram of an illustrative software configuration for a mobile device according to some embodiments of the present disclosure.

FIG. 2 illustrates a software environment 202 that may be implemented by a processor in the mobile device 102. The processor executes operating system software 204 that provides a platform from which the rest of the software operates. The operating system software 204 provides drivers for the mobile device hardware with standardized interfaces that are accessible to user application software. The operating system software 204 includes a web browser application 206, a media player application 208, Java applets 210, and an extension connector 212 application. The web browser application 206 configures the mobile device 102 to operate as a web browser, allowing the user to enter information into forms and select links to retrieve and view web pages. The media player application 208 configures the mobile device to retrieve and play audio or audiovisual media on its own output components or on the wireless interface extension 100. The Java applets 210 may configure the mobile device 102 to provide games, utilities, and other functionality on the mobile device 102 or on the wireless interface extension 100.

The extension connector 212 application is a component (or in some embodiments, a stand-alone application) that wirelessly connects the mobile device 102 to the wireless interface extension 100 to extend the capabilities of the mobile device 102. The extension connector 212 application obtains user input from the keys 106, a keypad, a microphone, a liquid crystal display (LCD) with a touch sensitive surface through a touch screen/LCD controller, joysticks, or other input devices. In response to user input, the extension connector 212 application may establish communications between the mobile device 102 and the wireless interface extension 100 to output content to the enhancement extension 100 for the user. After communications are established between the mobile device 102 and the wireless interface extension 100, the mobile device 102 may receive user input through the wireless interface extension 100 or continue to receive input through inputs for the mobile device 102.

Figure 3:
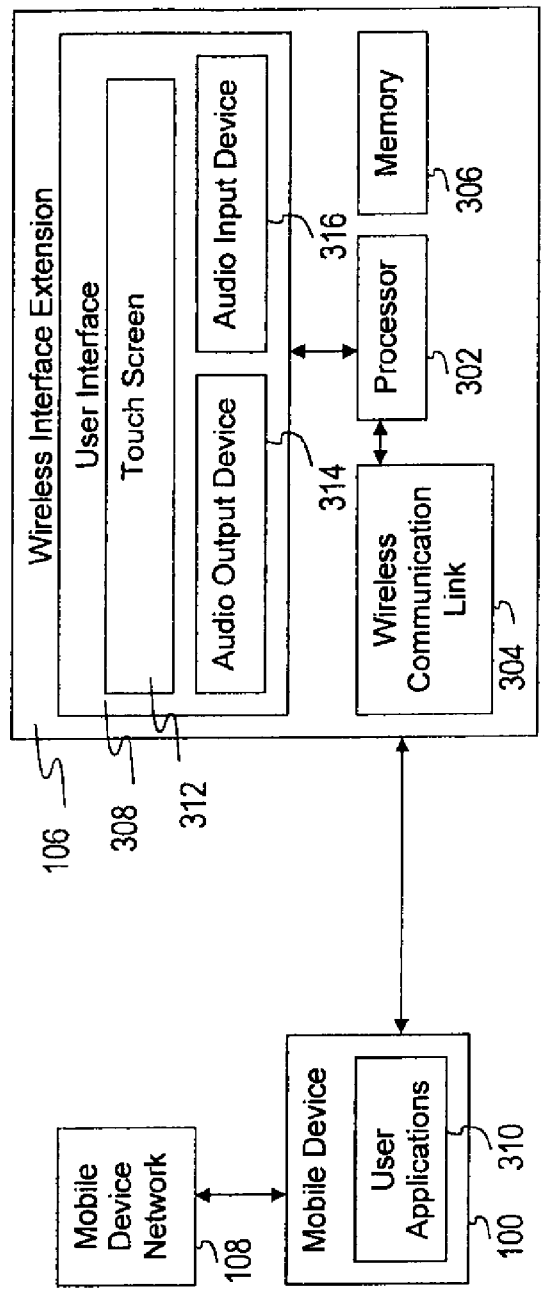
FIG. 3 shows a block diagram of a system for a wireless interface extension according to some embodiments of the present disclosure.

FIG. 3 shows a block diagram of a system for the wireless interface extension 100 according to an embodiment of the present disclosure. The wireless interface extension 100 contains a processor 302, a wireless communication link 304, a memory 306, and a user interface 308. The processor 302 communicates with the mobile device 102 over the wireless communication link 304. The processor 302 may store content from the communications over the wireless communication link 304 in the memory 306, which can include cache and random access memory. For example, the content stored may include voice mail, text messaging, ring-tones, calendars, games, video, electronic mail, navigation information, music, radio transmissions, television transmissions, and global position.

The user interface 308 enables a user to interface with the content or to communicate with at least one of the user applications 310 on the mobile device 102. The user applications 310 may include at least one of the following applications for users: camera, ring-tone selection, calendar, games, instant messenger, video, web browser, electronic mail, navigation, music, radio, television, and global positioning.

By having stored content in the memory 306, the processor 302 may output the stored content from the memory 306 to the user interface 308 when the mobile device 102 is not communicating with the mobile device network 108. For example, if the mobile device 102 retrieves video content from the mobile device network 108, the processor 302 may store the video in the memory 306 such that the video content may be viewed at any time selected by the user, long after the time that the video content is retrieved.

The capability to output the stored content from the memory 306 also enables the processor 302 to output content to the user interface 308 in a continuous stream, eliminating many output problems based on interrupted or discontinuous communications between the mobile device 102 and the mobile device network 108. For example, if the mobile device 102 is in the process of retrieving video content from the mobile device network 108, the processor 302 may store the video content in a cache in the memory 306 such that the video content may be buffered for continuous output to the user interface 308. If communications between the mobile device 102 and the mobile device network 108 are temporarily interrupted, the output to the user interface 308 may continue uninterrupted until communications between the mobile device 102 and the mobile device network 108 are re-established or until all of the content stored in the cache in the memory 306 is output to the user interface 308.

The user interface 308 may include a visual output device, which is a touch screen 312 in some embodiments of the present disclosure, an audio output device 314, and an audio input device 316. The touch screen 312 may provide the functions of the display 104 and the touch-sensitive surface 106 for the user. In some embodiments of the present disclosure, the visual output device is a display device that provides only the functions of the display 104. The visual output device 312, the audio output device 314, and the audio input device 316 for the user interface 308 are enhanced relative to the display 104, the audio output device, and the microphone for the mobile device 102. The visual output device 312 may be significantly larger than the display 104, and have a significantly higher resolution than the display 104. The audio output device 314 may have significantly greater volume, clarity, and range than the audio output device for the mobile device 102. The audio input device 316 may have significantly greater sensitivity and clarity than the microphone for the mobile device 102. In some embodiments, the audio output device 314 may connect to a multi-channel speaker system built into an automobile, while the audio input device 316 may include a microphone array with noise cancellation features.

In the case where the mobile device 102 is a mobile telephone handset, communication between the wireless interface extension 100 and the mobile device 102 may occur via standard short-range communications protocols, such as a radio frequency signal, an infrared signal, an ultrasonic signal, or other means of wireless communication. In some embodiments, communication occurs with a broadband personal area network protocol, such as Bluetooth.

Figure 4:
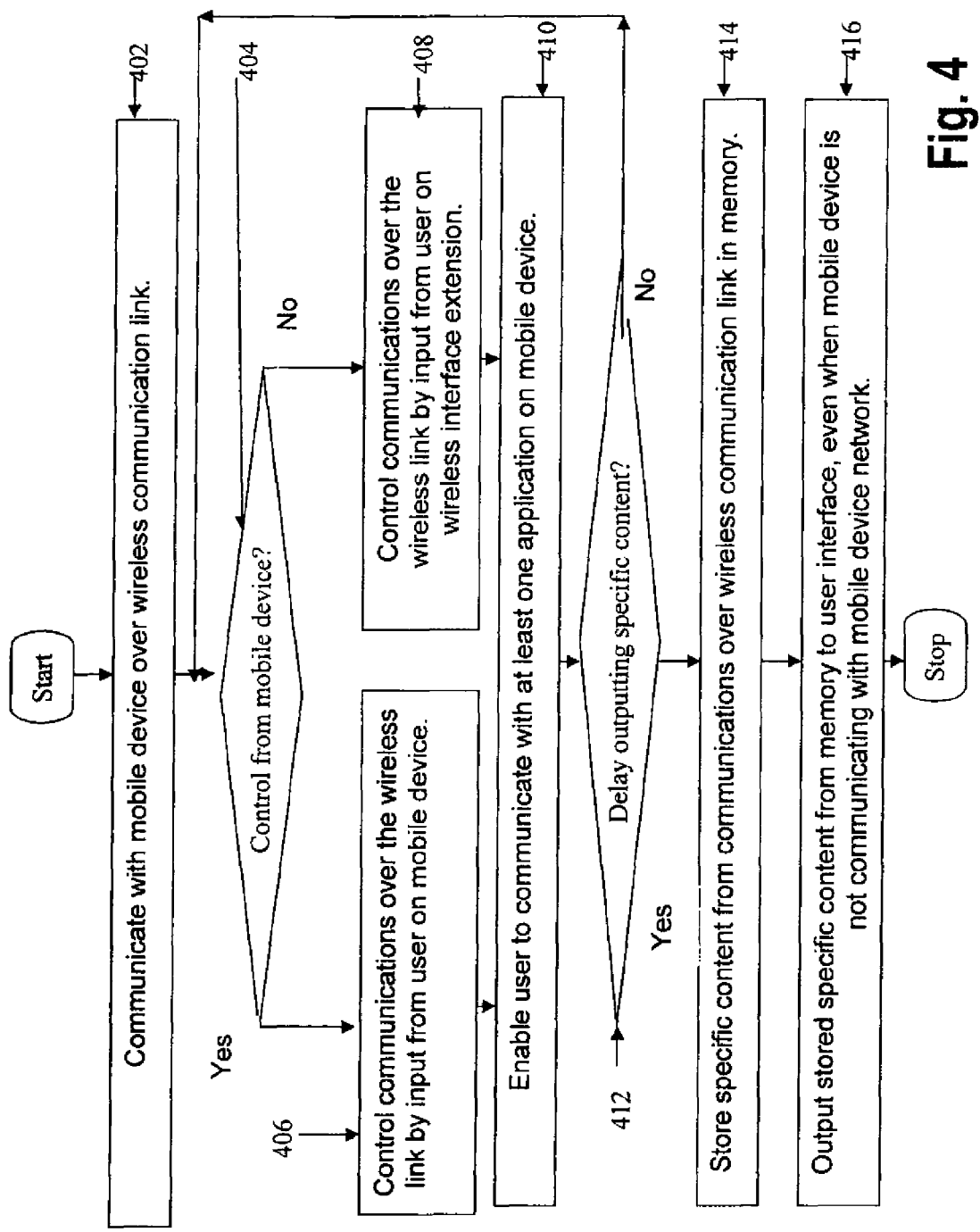
FIG. 4 shows a flowchart of a method for a wireless interface extension according to some embodiments of the present disclosure.

FIG. 4 is a flowchart illustrating a method for the wireless interface extension 100 according to an embodiment of the present disclosure. Executing the method enables a mobile device user to extend the usefulness of the mobile device 102 to the wireless interface extension 100, and permits interaction through the wireless interface extension 100 or the mobile device 102 with content communicated on the mobile device 102.

In box 402, the wireless interface extension 100 communicates with the mobile device 102 over the wireless communication link 304. The user may establish this communication by activating the extension connector 212 application by user input through the keys 106 or a microphone.

In box 404, the wireless interface extension 100 determines whether control is directed from the mobile device 102. When the user activates the extension connector 212 application through user input from the keys 106 or a microphone, the user may select the option of whether control is directed from the mobile device 102 or whether control is directed from the wireless interface extension 100. If the wireless interface extension 100 determines that control is directed from the mobile device 102, the method continues to box 406. If the wireless interface extension 100 determines that control is not directed from the mobile device 102, the method proceeds to box 408.

In box 406, the mobile device 102 receives control directly from the mobile device 102, such as through the keys 106 or a microphone, to control communications over the wireless communication link 304. Then the method proceeds to box 410.

In box 408, the mobile device 102 receives control directly from the wireless interface extension 100. The wireless interface extension 100 may output content to the user and receive input from the user through the touch screen 312. If control is not directed from the mobile device 102, the user may select an option through the touch screen 312 to return control to the mobile device 102.

In box 410, the wireless interface extension 100 enables the user to communicate with at least one of the user applications 310 on the mobile device 102. For example, the user may communicate with the user applications 310 on the mobile device by controlling communications over the wireless link 304 by user input through the mobile device 102 or the wireless interface extension 100. Through either type of communication control, the user may communicate with at least one of the user applications 310. For example, the user may provide input on the keys 106 on the mobile device 102 to control a television application on the mobile device 102 that is output to the wireless interface extension 100. In another example, the user may provide input on the touch screen 312 of the wireless interface extension 100 to control a navigation application on the mobile device that is output to the touch screen 312.

The menu options for a user application displayed on the touch screen 312 of the wireless interface extension 100 may appear similar to the menu options for the user application displayed on the display 104 of the mobile device 102. Alternatively, the menu options displayed on the wireless interface extension 100 may take advantage of the larger touch screen 312 to display a larger number of menu options than are available for viewing at one time on the display 104 for the mobile device 102. Similarly, the output of the user application may take advantage of the larger user interface 308 to display a larger amount of content than is available for display at one time on the mobile device 102, such as a larger navigation map for a driver of an automobile. Because of the potentially differing outputs and inputs to the user interface 308 on the wireless interface extension 100, the processor 302 on the wireless interface extension 100 may process user inputs to the user interface 308 to convert these inputs to forms recognized by the user applications 310 on the mobile device 102.

In box 412, the wireless interface extension 100 determines whether to delay outputting specific content to the user. The specific content for delayed output may be specified by a lack of communication between the mobile device 102 with the mobile device network 108 or by input from the user on the mobile device 102 or on the wireless interface extension 100. If the wireless interface extension 100 determines to delay outputting specific content to the user, the method continues to box 414. If the wireless interface extension 100 determines to not delay outputting specific content to the user, the method returns to box 404 to determine whether control is directed from the mobile device 102.

In box 414, the wireless interface extension 100 stores specific content from communications over the wireless communication link 304 in the memory 306. By storing specific content in the memory 306, the wireless interface extension 100 may output the stored specific content at a later time or output the specific content continuously even when the mobile device 102 is not communicating with the mobile device network 108.

In box 416, the wireless interface extension 100 outputs stored specific content from the memory 306 to the user interface 308, even when the mobile device 102 is not communicating with mobile device network 108. For example, the wireless interface extension 100 may store game content from communications with a game application on the mobile device 102 and output the game content stored in the memory 306 to the touch screen 312 when later requested by the user. Multiple users may each use a separate mobile device to play the game by interacting with the game content that is output to the user interface 308.

Figure 5:
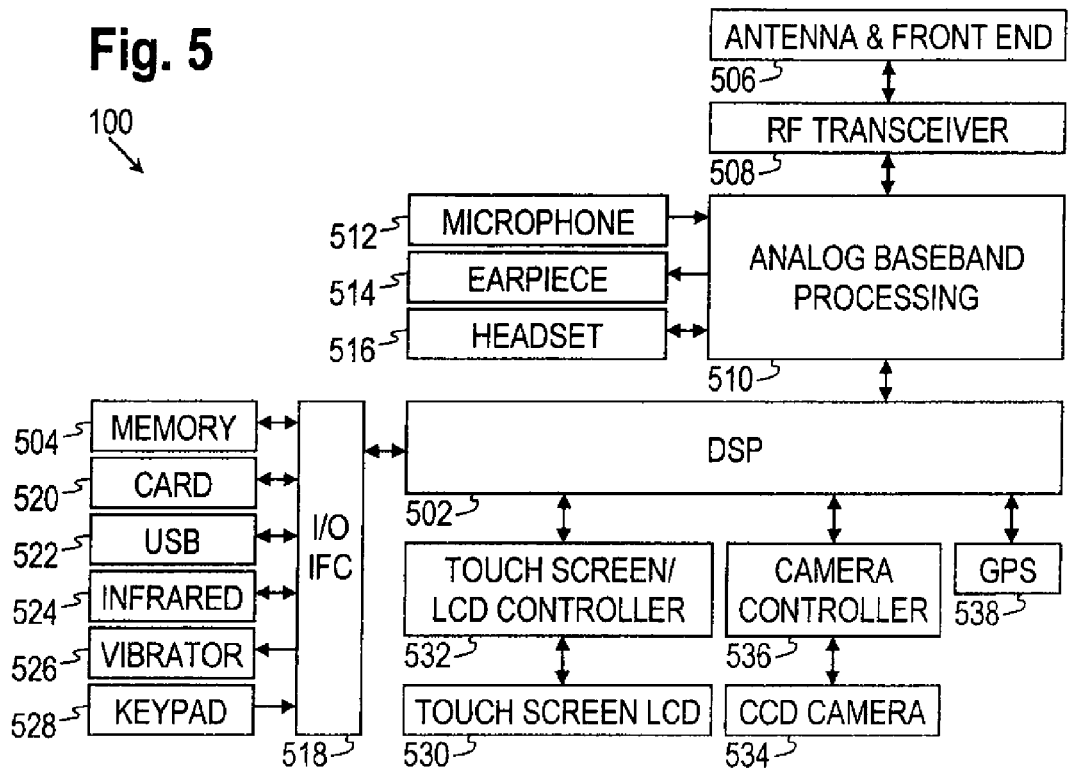
FIG. 5 shows a block diagram of an illustrative mobile device.

FIG. 5 shows a block diagram of the mobile device 102. The mobile device 102 is configured to operate with the wireless interface extension 100. The mobile device 102 includes a digital signal processor (DSP) 502 and a memory 504. As shown, the mobile device 102 may further include an antenna and front end unit 506, a radio frequency (RF) transceiver 508, an analog baseband processing unit 510, a microphone 512, an earpiece speaker 514, a headset port 516, an input/output interface 518, a memory card 520, a universal serial bus (USB) port 522, an infrared port 524, a vibrator 526, a keypad 528, a liquid crystal display (LCD) with a touch sensitive surface 530, a touch screen/LCD controller 532, a charge-coupled device (CCD) camera 534, a camera controller 536, and a global positioning system (GPS) sensor 538.

The DSP 502 or some other form of controller or central processing unit operates to control the various components of the mobile device 102 in accordance with embedded software or firmware stored in the memory 504. In addition to the embedded software or firmware, the DSP 502 may execute other user applications stored in the memory 504 or made available via information carrier media such as portable data storage media like the memory card 520 or via wired or wireless network communications. The user application software may comprise a compiled set of machine-readable instructions that configure the DSP 502 to provide the desired functionality, or the user application software may be high-level software instructions to be processed by an interpreter or compiler to indirectly configure the DSP 502.

The antenna and front end unit 506 may be provided to convert between wireless signals and electrical signals, enabling the mobile device 102 to send and receive information from a cellular network or some other available wireless communications network, and to send and receive information from the wireless interface extension 100. The RF transceiver 508 provides frequency shifting, e.g., converting received RF signals to baseband and converting baseband transmit signals to RF. The analog baseband processing unit 510 may provide channel equalization and signal demodulation to extract information from received signals, may modulate information to create transmit signals, and may provide analog filtering for audio signals. To that end, the analog baseband processing unit 510 may have ports for connecting to the built-in microphone 512 and the earpiece speaker 514 that enable the mobile device 102 to be used as a cell phone. The analog baseband processing unit 510 may further include a port for connecting to a headset or other hands-free microphone and speaker configuration. The audio output device 314 for the wireless interface extension 100 may have greater volume, clarity, and range than the headset or the speaker configuration connected by the port to the analog baseband processing unit 510 or the earpiece speaker 514. The audio input device 316 for the wireless interface extension 100 may have greater sensitivity and clarity than the headset connected by the port to the analog baseband processing unit 510 or the microphone 512.

The DSP 502 may send and receive digital communications with a wireless network via the analog baseband processing unit 510. In some embodiments, these digital communications may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the infrared port 524. The USB interface 522 may enable the mobile device 102 to function as a peripheral device to exchange information with a personal computer or other computer system. The infrared port 524 and other optional ports such as a Bluetooth interface or an IEEE 802.11 compliant wireless interface may enable the mobile device 102 to communicate wirelessly with the wireless interface extension 100, other nearby mobile devices, and/or wireless base stations. By using a secure interface, such as the Bluetooth interface, the mobile device 102 may securely communicate with the wireless interface extension 100 such that other communication receivers may not access these secure communications. In some contemplated systems, the mobile device 102 is able to wirelessly exchange information at a point-of-sale when placed near a suitable transceiver.

The input/output interface 518 may further connect the DSP 502 to the vibrator 526 that, when triggered, causes the mobile device 102 to vibrate. The vibrator 526 may serve as a mechanism for silently alerting the user to any of various events such as an incoming call, a new text message, and an appointment reminder.

The keypad 528 couples to the DSP 502 via the I/O interface 518 to provide one mechanism for the user to make selections, enter information, and otherwise provide input to the mobile device 102. Another input mechanism may be the touch screen display 530, which may also display text and/or graphics to the user. The display controller 532 couples the DSP 502 to the touch screen display 530. Yet another input mechanism for the mobile device 102 may be the touch screen 312. The touch screen 312 for the wireless interface extension 100 may be larger and have greater resolution than the touch screen display 530.

The CCD camera 534 enables the mobile device 102 to take digital pictures. The DSP 502 communicates with the camera 534 via the camera controller 536. The GPS sensor 538 is coupled to the DSP 502 to decode global positioning system signals, thereby enabling the mobile device 102 to determine its position. In addition to the wireless interface extension 100, various peripherals may also be included to provide additional functions, e.g., radio and television reception.

Figure 6:
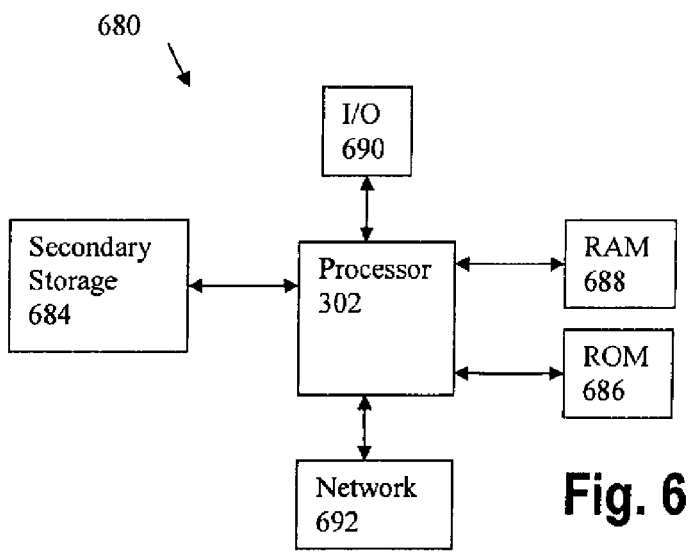
FIG. 6 shows an illustrative general purpose computer system suitable for implementing portions of the several embodiments of the present disclosure.

Parts of the system described above may be implemented on any general-purpose computer with sufficient processing power, memory resources, and network throughput capability to handle the necessary workload placed upon it. FIG. 6 illustrates a computer 680, which is suitable for implementing one or more wireless interface extension embodiments disclosed herein. The computer 680 includes the processor 302 (which may be referred to as a central processor unit or CPU) that is in communication with memory devices including secondary storage 684, read only memory (ROM) 686, random access memory (RAM) 688, input/output (I/O) 690 devices, and network connectivity devices 692. The processor 302 may be implemented as one or more CPU chips. The ROM 686 and the RAM 688 may be part of the memory 306. The network connectivity devices may include the wireless communication link 304.

The secondary storage 684 is typically comprised of one or more disk drives or tape drives and is used for non-volatile storage of data and as an over-flow data storage device if RAM 688 is not large enough to hold all working data. Secondary storage 684 may be used to store programs which are loaded into RAM 688 when such programs are selected for execution. The ROM 686 is used to store instructions and perhaps data which are read during program execution. ROM 686 is a non-volatile memory device which typically has a small memory capacity relative to the larger memory capacity of the secondary storage 684. The RAM 688 is used to store volatile data and perhaps to store instructions. Access to both ROM 686 and RAM 688 is typically faster than to secondary storage 684.

I/O 690 devices may include the wireless communication link 304, the touch screen 312, the audio output device 314, the audio input device 316, printers, video monitors, liquid crystal displays (LCDs), keyboards, keypads, switches, dials, mice, track balls, voice recognizers, card readers, paper tape readers, or other well-known input devices. The network connectivity devices 692 may take the form of touch screens, speakers, microphones, modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 692 devices may enable the processor 302 to communicate with an Internet or one or more intranets through the mobile device 102. With such a network connection, it is contemplated that the processor 302 might receive information from the network, or might output information to the network in the course of performing the above-described method steps. Such information, which is often represented as a sequence of instructions to be executed using the processor 302, may be received from and outputted to the network, for example, in the form of a computer data signal embodied in a carrier wave.

Such information, which may include data or instructions to be executed using the processor 302 for example, may be received from and outputted to the network, for example, in the form of a computer data baseband signal or signal embodied in a carrier wave. The baseband signal or signal embodied in the carrier wave generated by the network connectivity 692 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 302 executes instructions, codes, computer programs, scripts which it accesses from hard disk, floppy disk, optical disk (these various disk based systems may all be considered secondary storage 684), ROM 686, RAM 688, or the network connectivity devices 692.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A wireless interface display extension for mobile devices, comprising:
    a user interface;
    a short range wireless communication link; and
    a processor that communicates with a first one of the mobile devices over the wireless communication link, and outputs to the user interface display content of the at least one user application on the first one of the mobile devices, wherein interactions with the content output to the user interface are controlled by user input from at least a second one of the mobile devices that is received over the wireless communication link.

2. The wireless interface extension of claim 1 wherein the user interface includes a touch screen to output content to a user of the wireless interface extension and receive input from the user of the wireless interface extension.

3. The wireless interface extension of claim 2 wherein communications over the wireless communication link are controlled by input from the user of the wireless interface extension on the touch screen.

4. The wireless interface extension of claim 1 further comprising a memory, wherein the processor stores content that the one of the mobile devices received over a mobile device network in the memory and outputs the content from the memory to the user interface.

5. The wireless interface extension of claim 4, wherein the content that the one of the mobile devices received over the mobile device network comprises streaming content received over the mobile device network, wherein storing the content in the memory comprises buffering the streaming content in the memory, and wherein outputting the content from the memory to the user interface comprises continuously outputting the streaming content buffered in the memory to the user interface regardless of whether the one of the mobile devices is communicating with the mobile device network.

6. The wireless interface extension of claim 1 wherein the user interface comprises a visual output device and an audio output device that are enhanced relative to a visual output device and an audio output device for the one of the mobile devices.

7. The wireless interface extension of claim 1 wherein the at least one user application on the one of the mobile devices comprises at least one of camera, ring-tone selection, calendar, games, instant messenger, video, web browser, electronic mail, navigation, music, radio, television, and global positioning.

8. The wireless interface extension of claim 1, wherein the user interface displays a larger amount of content than is available for display at one time on the one of the mobile devices.

9. The wireless interface extension of claim 8, wherein the processor processes a user input to the user interface to convert the user input to a form recognized by the at least one user application on the one of the mobile devices.

10. A mobile device interface enhancement method, comprising:
    displaying on a wireless interface extension a graphical user interface associated with at least one user application on a mobile device, wherein the displaying further comprises:
        storing, in a memory of the wireless interface extension, streaming content received by the mobile device over a mobile device network, wherein storing the content in the memory comprises buffering the streaming content in the memory, the memory physically disconnected from the mobile device and communication between the mobile device and the memory is conducted over a short range wireless communication link; and outputting the streaming content from the memory to the graphical user interface regardless of whether the mobile device is communicating with the mobile device network;

receiving a user input via the wireless interface extension; and communicating the user input to the at least one user application on the mobile device over the wireless communication link.

11. The method of claim 10 wherein receiving the user input via the wireless interface extension comprises receiving user input through a touch screen.

12. The method of claim 10 further comprising receiving the user input via input from the user on the mobile device.

13. A mobile device comprising:

a short range wireless communication link;

a user interface to enable a user to communicate with at least one user application on the mobile device; and a processor to communicate activity of the at least one user application to a display of the least one user application on a wireless interface extension, wherein the processor communicates the activity over the wireless communication link, and wherein communications over the wireless communication link are controlled by input from the user on the user interface of the mobile device, and wherein at least some functions of the at least one user application are controlled by user input on another mobile device received from the wireless interface extension.

14. The mobile device of claim 13 wherein the wireless interface extension further comprises a touch screen to output content to the user and receive input from the user.

15. The mobile device of claim 14 wherein communications over the wireless communication link are controlled by input from the user on the touch screen.

16. The mobile device of claim 13 wherein the wireless interface extension further stores content that the mobile device received over a mobile device network in a memory and outputs the content to the display of the least one user application on the wireless interface extension.

* * * * *